(12) United States Patent
Thorwirth et al.

(10) Patent No.: US 9,226,047 B2
(45) Date of Patent: Dec. 29, 2015

(54) SYSTEMS AND METHODS FOR PERFORMING SEMANTIC ANALYSIS OF MEDIA OBJECTS

(75) Inventors: Niels J. Thorwirth, San Diego, CA (US); Thomas Munro, La Jolla, CA (US); Robert Kulakowski, San Diego, CA (US)

(73) Assignee: Verimatrix, Inc., San Diego, CA (US)

( * ) Notice: Subject to any disclaimer, the term of this patent is extended or adjusted under 35 U.S.C. 154(b) by 1207 days.

(21) Appl. No.: 13/266,761

(22) PCT Filed: Dec. 8, 2008
(Under 37 CFR 1.47)

(86) PCT No.: PCT/US2008/085993
§ 371 (c)(1),
(2), (4) Date: Jun. 15, 2012

(87) PCT Pub. No.: WO2009/073895
PCT Pub. Date: Jun. 11, 2009

(65) Prior Publication Data
US 2013/0097625 A1  Apr. 18, 2013

(51) Int. Cl.
| | | |
|---|---|---|
| H04N 7/16 | (2011.01) | |
| H04N 9/80 | (2006.01) | |
| H04N 21/835 | (2011.01) | |
| G06F 17/30 | (2006.01) | |
| G11B 27/28 | (2006.01) | |
| H04N 21/231 | (2011.01) | |
| H04N 21/2343 | (2011.01) | |
| H04N 21/44 | (2011.01) | |
| H04N 21/4627 | (2011.01) | |
| H04N 21/8358 | (2011.01) | |
| H04N 5/913 | (2006.01) | |

(52) U.S. Cl.
CPC ........ *H04N 21/835* (2013.01); *G06F 17/30038* (2013.01); *G11B 27/28* (2013.01); *H04N 5/913* (2013.01); *H04N 21/23109* (2013.01); *H04N 21/234318* (2013.01); *H04N 21/44008* (2013.01); *H04N 21/4627* (2013.01); *H04N 21/8358* (2013.01)

(58) Field of Classification Search
None
See application file for complete search history.

(56) References Cited

U.S. PATENT DOCUMENTS

| 7,171,016 | B1 | 1/2007 | Rhoads et al. | |
|---|---|---|---|---|
| 7,248,717 | B2 | 7/2007 | Rhoads | |
| 2002/0114522 | A1* | 8/2002 | Seeber | 382/218 |
| 2005/0286736 | A1 | 12/2005 | Rhoads | |

(Continued)

OTHER PUBLICATIONS

International Search Report for PCT/US2008/085993 filed Dec. 8, 2008, Report completed Feb. 9, 2009, mailed Feb. 23, 2009, 3 pgs.

(Continued)

*Primary Examiner* — Jason K Lin
(74) *Attorney, Agent, or Firm* — KPPB LLP

(57) ABSTRACT

System and method for identification of ownership to media objects through analysis of semantic information in the media objects are disclosed Semantic information is a term that can be used to describe aspects of the content of a media object that are apparent to a human viewing or listening to the content One embodiment of the invention includes extracting semantic information from a specified media object, matching said semantic information of the specified media object against known semantic information of known media objects, and taking action based on the result of the companson.

23 Claims, 4 Drawing Sheets

(56) References Cited

U.S. PATENT DOCUMENTS

| | | | |
|---|---|---|---|
| 2006/0015497 | A1 | 1/2006 | Keating |
| 2006/0159262 | A1* | 7/2006 | Guillemot et al. ............ 380/210 |
| 2006/0271500 | A1* | 11/2006 | Obrea et al. .................... 705/76 |
| 2007/0052854 | A1 | 3/2007 | Yeh et al. |
| 2007/0055695 | A1 | 3/2007 | Dorai et al. |
| 2008/0098433 | A1* | 4/2008 | Hardacker et al. .............. 725/52 |
| 2008/0134232 | A1* | 6/2008 | Rhoads ........................... 725/28 |
| 2008/0271080 | A1* | 10/2008 | Gossweiler et al. ............ 725/47 |
| 2009/0041311 | A1 | 2/2009 | Hundley |
| 2012/0185891 | A1* | 7/2012 | Conradt et al. ................. 725/25 |

OTHER PUBLICATIONS

Written Opinion of the International Searching Authority for PCT/US2008/085993 filed Dec. 8, 2008, Report completed Feb. 11, 2009, mailed Feb. 23, 2009, 4 pgs.

Alex Reis Dos Santos et al., "Real-Time Opaque and Semi-Transparent TV Logos Detection", Retrieved from: http://www.lps.usp.br/~hae/i2ts2006-logo.pdf, 7 pgs.

Balint Seeber et al., "Real-time Detection of Semi-transparent Watermarks in Decompressed Video", Eighth IEEE Workshop on Applications of Computer Vision (WACV'07), Austin Texas, Feb. 21-22, 2007.

C. Snoek et al., "Multimodal Video Indexing: A Review of the State-of-the-art", Intelligent Sensory Information Systems, University of Amsterdam, The Netherlands, pp. 1-38.

J. Wang et al., "Automatic TV Logo Detection, Tracking and Removal in Broadcast Video", Lecture Notes in Computer Science, Springer-Verlag, Germany, vol. 4352, 2007, pp. 63-72.

Karpathy, Andrej et al., "Large-scale Video Classification with Convolutional Neural Networks", 2014.

Karpathy, Andrej et al., "Large-scale Video Classification with Convolutional Neural Networks", In: Proc. CVPR (2014), 8 Pgs.

Seeber, B. et al., "Real-time Detection of Semi-transparent Watermarks in Decompressed Video", Eighth IEEE Workshop on Applications of Computer Vision (WACV'07), 2007.

Snoek, C. et al., "Multimodal Video Indexing: A Review of the State-Of-The-Art", Intelligent Sensory Information Systems Group, University of Amsterdam, 2001.

Wang, J. et al., "Automatic TV Logo Detection, Tracking and Removal in Broadcast Video", Lecture Notes in Computer Science, No. 4352, Springer-Verlag, Germany, ISSN 0302-9743, 9 Pages., 2007.

* cited by examiner

SYSTEMS AND METHODS FOR PERFORMING SEMANTIC ANALYSIS OF MEDIA OBJECTS

BACKGROUND OF THE INVENTION

The present invention relates to identification of ownership and usage rights of media objects (such as image, video and audio data) as they are disseminated on the Internet.

Transmission of media objects (including, e.g., images, video and audio) on the Internet is quick and simple. While advantageous in many aspects, one problem with technologies that enable the distribution of multimedia objects through the Internet is that they can also make media objects available to an audience that does not have the right to consume the works.

The term "media object" can refer to audio, video, image, graphic, multimedia, textual, and interactive data files that are delivered to a user's computer via a communication network such as the Internet. A media object can also be a streaming media file that is transferred through a networked environment and that plays on the user's computer before delivery of the entire file is completed and/or a file that is stored on a user's computer. Examples of media objects include digitally recorded music, movies, trailers, shows, news reports, still images, radio broadcasts and recordings of live events that are available through the Internet. Means for accessing the communications networks to obtain media files include high-bandwidth connections such as cable, DSL and T1 communication lines.

New technologies that allow easier and faster processing and transmission of media objects accelerate their distribution. This resulting ease of distribution makes it difficult for copyright holders to the content of such materials to track consumption of their works. Finding a specific media object buried among the many files on the Web and the identification of the associated usage rights is typically a very difficult task. The volume and variety of media objects distributed on the Internet is likely to continue to increase at a rather substantial pace. This growth, combined with the highly decentralized nature of the Internet, creates substantial difficulty in locating particular informational content and therefore makes it difficult for copyright owners to track and control the use of their content. For example, there are many clips of copyrighted TV content, such as news reports, comedy sketches and sports events published by $3^{rd}$ parties on the Internet without the knowledge or consent of the copyright owner. One platform for distribution of such content are User Generated Content (UGC) sites that have recently gained popularity. They do however not only contain content generated by users but include content that users upload without having the rights to it. Another example for a widely used distribution platform is so called peer-to-peer software that allows computer users to share files amongst them without the use of a centralized data repository.

The problem of unidentified content has become particularly apparent in recent months with online video sites rumored to be distributing more than one hundred million video clips daily. The distribution of this content in combination with advertising has a substantial commercial value, demonstrated by a law suit filed against a leading online video provider that claims damages in excess of one billion dollars. Technologies that identify the content owner can help to eliminate or reduce the legal risk that content distributors are facing when distributing copyrighted content. They furthermore can help to create revenue for a content owner, when revenues from advertisement displayed with the content are shared between the content distributor and the content owner.

To solve or alleviate the problem three main solutions have been created and refined in the past. One approach for identifying media objects compares the metadata associated with a media file, such as file name, Universal Resource Indicator, or information such as the title directly encoded in the file, to a database of metadata associated with known media files. A limitation of this approach is that the information required for this approach to be effective is often removed during illegal distribution of the content.

Another approach is the identification of media objects with digital watermarks that invisibly embed robust information in the content before distribution, such that the content that has undergone a marking procedure can be automatically identified by reading that mark out of the content itself. To enable that protection, all content to be protected has to be marked prior to any public distribution using digital processing of the media. The mark can reliably be read from content that has undergone limited degradation but is often unreadable if significant geometric distortions have been applied and the shape and size and playback speed varies from its original format.

A third way of identifying media objects is by comparing the physical characteristics of media objects. A technique called fingerprinting aims to determine if a copy of a media object is derived from a specific copyrighted source, even if those media objects have undergone transformations like re-recording and compression. For comparison, existing media objects that are to be identified have to be registered and their fingerprints are determined. Two files with a limited variation between them that have the same or similar fingerprints are likely to contain the same content. Combined with a priori knowledge of who is the legitimate rights holder to the media object, this information can be used to identify intellectual property rights. A challenge with this approach is the complexity of comparison of an ever growing volume of copyrighted media content with the rapidly growing number of media objects available on the Internet.

SUMMARY OF INVENTION

The present invention describes an alternative method for comparison by identification of content using its semantic properties.

In accordance with one embodiment of the present invention, a monitoring system analyzes media objects for semantic properties that can be used to estimate ownership rights.

In some embodiments, various types of screening operations can be applied to media objects in order to identify those media objects that are most likely to contain properties identifying ownership and operations are performed only on this subset of the media objects.

One embodiment of the invention includes extracting the signaling image from the video content by combining several frames of video content, recognizing said signaling image extracted from the video content, retrieving the usage rights associated with the recognized signaling image, and restricting access to the digital video content in accordance with the retrieved usage rights.

In a further embodiment, the signaling image embedded within the content is invisible.

In another embodiment, the signaling image embedded within the content is visible.

In a still further embodiment, the data transmitted within the image conveys usage information.

Still another embodiment includes extracting the TV station logo from the video content by combining several frames of video content, identifying the TV station logo by determining the TV station logo from known TV station logos that most closely matches said TV station logo extracted from the video content, retrieving the usage rights associated with the identified TV station logo, and restricting access to the digital video content in accordance with the retrieved usage rights.

In a yet further embodiment, said limitation of access includes combination of advertisement with said video content.

In yet another embodiment, said TV station logo is visibly embedded within the video content.

In a further embodiment again, said TV station logo is invisibly embedded within the video content.

Another embodiment again includes extracting the TV station logo from the video content, matching said TV station logo of the specified video content against known TV station logos, determining the TV station logo from known TV station logos that most closely matches said TV station logo, and using known properties of the known TV station logo to determine the transformation of the video content.

In a further additional embodiment, said TV station logo is visible within the video content.

In another additional embodiment, said TV station logo is invisibly embedded within the video content.

In a still yet further embodiment the determined transformation is used to derive the geometric transformation of the video content.

In still yet another embodiment, the determined transformation is used to derive the geometric transformations to an embedded invisible watermark.

A still further embodiment again includes extracting at least one semantic property from a specified media object, matching said at least one semantic property of the specified media object against known semantic properties of known media objects, comparing matches between said at least one semantic property and known semantic properties to a threshold value, determining allowed actions that can be performed with respect to the media object based upon the result of the comparison, and restricting access to the media object in accordance with the allowed actions.

In still another embodiment again, said located media objects are present at least one of: a web site, an file transport protocol site, a peer to peer network, a disc drive, a hard drive, a computer, a compact disc, and a digital video disc.

In a still further additional embodiment, the known semantic properties are derived from previously identified semantic properties.

In still another additional embodiment, the semantic property is identification of a TV station logo on at least one frame of a video track within the media object.

In a yet further embodiment again, the semantic information is the result of optical character recognition on at least one frame of a video track within the media object.

In yet another embodiment again, the semantic property is the result of performing speaker recognition on an audio track within the media object.

In a yet further additional embodiment, the semantic property is the result of performing automated speech recognition on an audio track within the media object.

In yet another additional embodiment, said restriction of access includes restriction to playback in combination of advertisement with said video content.

In a further additional embodiment again, said restriction of access includes notification of the content distributor of the access rights.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
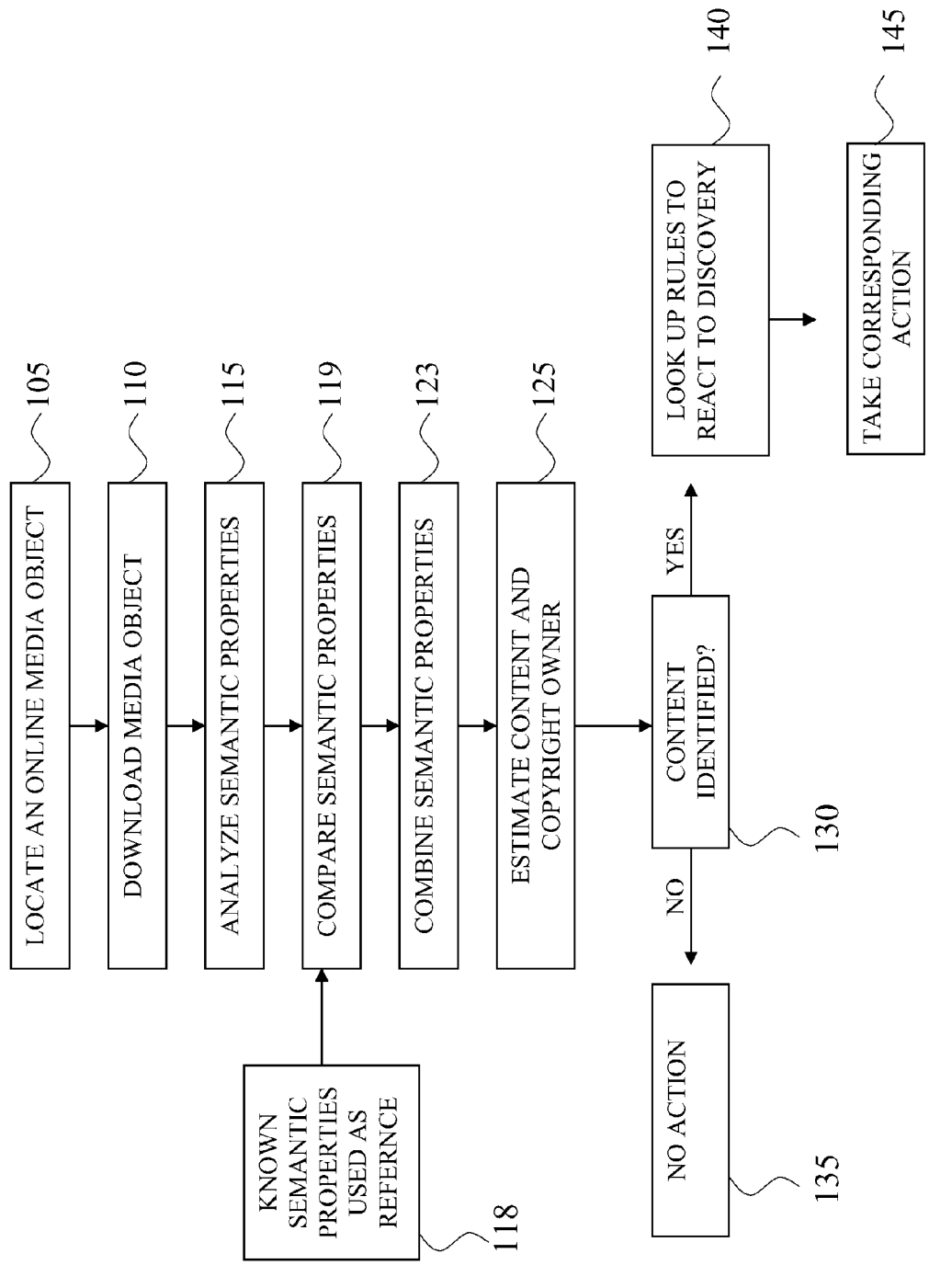
FIG. 1 is an illustrative flow diagram of a semantic analysis process, according to one embodiment of the invention.

Turning now to the drawings, the present invention involves a system and method for identification of ownership to media objects through analysis of semantic information in the media objects. Media objects are rich with semantic elements or properties, which can collectively be referred to as semantic information that allow identification of the content without reference to a previously identified copy of the content, and can be used to establish ownership of the content. Semantic element is a term that can be used to describe a feature of the content of a media object that is apparent to a human viewing or listening to the content and that contributes to the content, or an aspect of the content that is relevant to the human consumer. Processes involving extraction of semantic information determine what is being viewed. Semantic information can be more useful in identification than a comparison of two pieces of content, because semantic information can be efficiently organized in a database for searching without the need to maintain vast libraries of content and/or fingerprints. The comparison data is often pre-existing as it is extracted for other applications such as video search or consumer information. Semantic information can be used to identify previously unseen content, because identification using semantic information can involve identifying the likely owner of the content and does not necessarily involve determining the identity of the specific piece of content in question.

In many embodiments, the media object is analyzed for various semantic elements that are indicative of media ownership such as, but not limited to, station identification logos, franchise logos (e.g., the title credits of a popular television series), theme songs, the distinctive voice of a news presenter, the face and/or voice of an actor and/or other characteristics of the media object are used as a basis for determining entities associated with the media object. Essentially, the system attempts to identify content in the way a human recognizes content. Information about the content is observed and then matched against metadata (i.e. data describing content) or a class of content as opposed to properties that are limited for the purpose of comparison of individual media objects or information that has been imperceptibly embedded in specific media objects for the purpose of later retrieval. Systems in accordance with embodiments of the invention differ from fingerprinting approaches in that the systems look for characteristics within potentially previously unregistered media that are known to be associated with a particular entity, whereas fingerprinting systems typically require that the media objects have been previously analyzed to extract a fingerprint, which is used to identify the specific piece of content. Systems in accordance with some embodiments of the invention differ from watermarking systems in that they rely on semantic information inherent to the content of the media object as opposed to information embedded into the media object that is imperceptibly embedded for the purpose of content recognition. In a number of embodiments, the system is a learning system that can learn associations between particular features to improve recognition accuracy.

One group of semantic properties well suited for content identification are visual identifiers such as logos for age ratings, indicators for live content, copyright or ownership indicators and broadcast station bugs, that are grouped and commonly referred to as TV station logos herein. TV station logos can be used to identify the owner of content. In addition, use of different TV station logos by content distributors can communication information concerning usage rights in content. The presence of TV station logos can also be useful in determining manipulations that may have been performed to a media object for purposes including, but not limited, to recovering watermark information.

Methods in accordance with embodiments of the invention can be implemented using software resident on a server, resident on a personal computer, resident on a consumer electronics device, or resident on any other form of computing devices. In a number of embodiments, a server analyzes media objects hosted on another server. In several embodiments, a server analyzes media objects uploaded to the server and in a number of embodiments, a client application analyzes media objects prior to playback.

Referring to FIG. 1, in one embodiment, a flow diagram of a semantic analysis process is shown. The media object is located 105 through scanning online sites. It is then downloaded 110 and analyzed 115 for at least one semantic property. The semantic properties of the media object are compared 119 with known semantic properties that are stored in a database 118 where the characteristics of the semantic properties are stored together with information concerning the copyright owner with which the semantic properties are associated. If several semantic properties are analyzed, they are combined 123 and the copyright owner is estimated 125. A decision is made to conclude if the estimation is good enough to conclude that the copyright owner is identified 130. If the probability of correct identification is above a given value, then the copyright owner of the content is assumed to have been identified, and a look-up is performed 140, to determine if rules are stored to react to identification. The look up can include elements of the location in which the media object is found, the copyright owner and other knowledge about the content that has been retrieved, such as creator, creation time or broadcast time. Rules can include action to stop further distribution of the content or notify the distributor that the content is copyright protected. These notifications to so called UCG sites are also called take down notices. If such an action is defined by the rules, it is executed accordingly 145.

Figure 2:
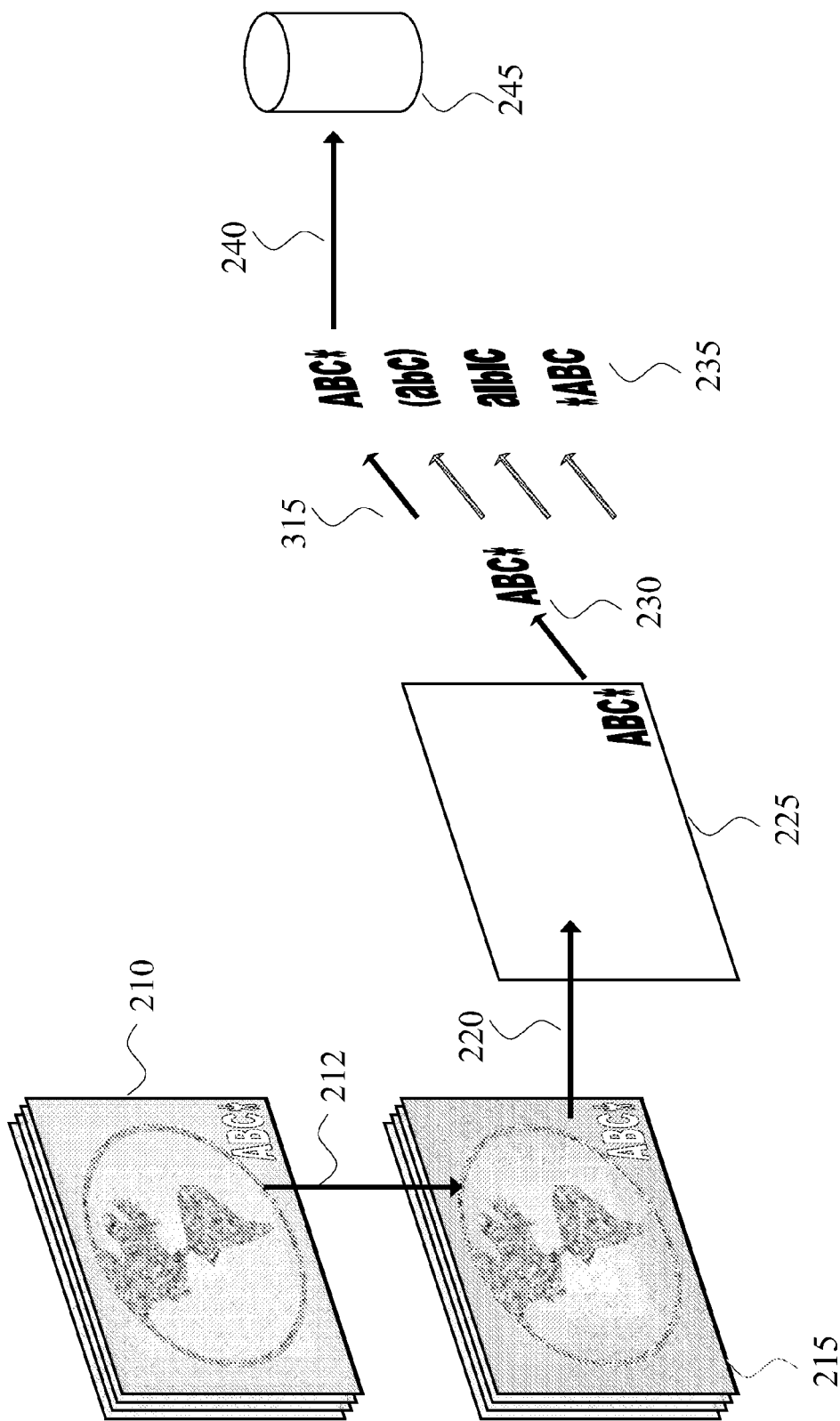
FIG. 2 is an illustrative diagram of a piece of content that is downloaded, its TV station logo is extracted and compared to known TV station logos. A match is found and the content owner is estimated by looking up information of the content owner and required action in a database. The identified logo can also be used to signal usage rights directly if different logo variations are used for different classes of usage rights.

Referring to FIG. 2, in one embodiment, a diagram of a video clip media object 210 that is located on the Internet. It is downloaded or retrieved in part 212 e.g., to a hard drive or memory location to a local media object 215. The following analysis step 220 creates a processed media object 225 and extracts semantic properties 225; here it is a TV station logo. The semantic property is compared 315 to semantic properties that serve as a reference 235. The reference properties are linked 240 to more information about the corresponding copyright owner or content origin in a reference database 245.

An example for one piece of semantic information contained in much of current and past TV content is a visual station identification also known as broadcast or TV—bug, DOG or watermark (note: this is not an invisible digital watermark). It is used to signal origin of the content to the human viewer. They are thus a form of permanent visual station identification, used to increase brand recognition and for asserting ownership of the video signal. They appear as opaque or transparent logos, permanent or animated and are often in a corner of the screen. They might hold additional information such as a score during a sporting event, advertising for future television events, news ticker symbols or a 'live' identification to signal that a broadcast was originally transmitted live. Visual station identifications are typically unique to a specific TV station as they are trademarks.

Automatic recognition of these logos allows for unique identification of the broadcast source. The recognition can be performed on highly degraded content since the logo is typically designed to be easily recognizable and it is frequently displayed on the screen for a long period or for the entire duration of the programming.

Figure 2B:
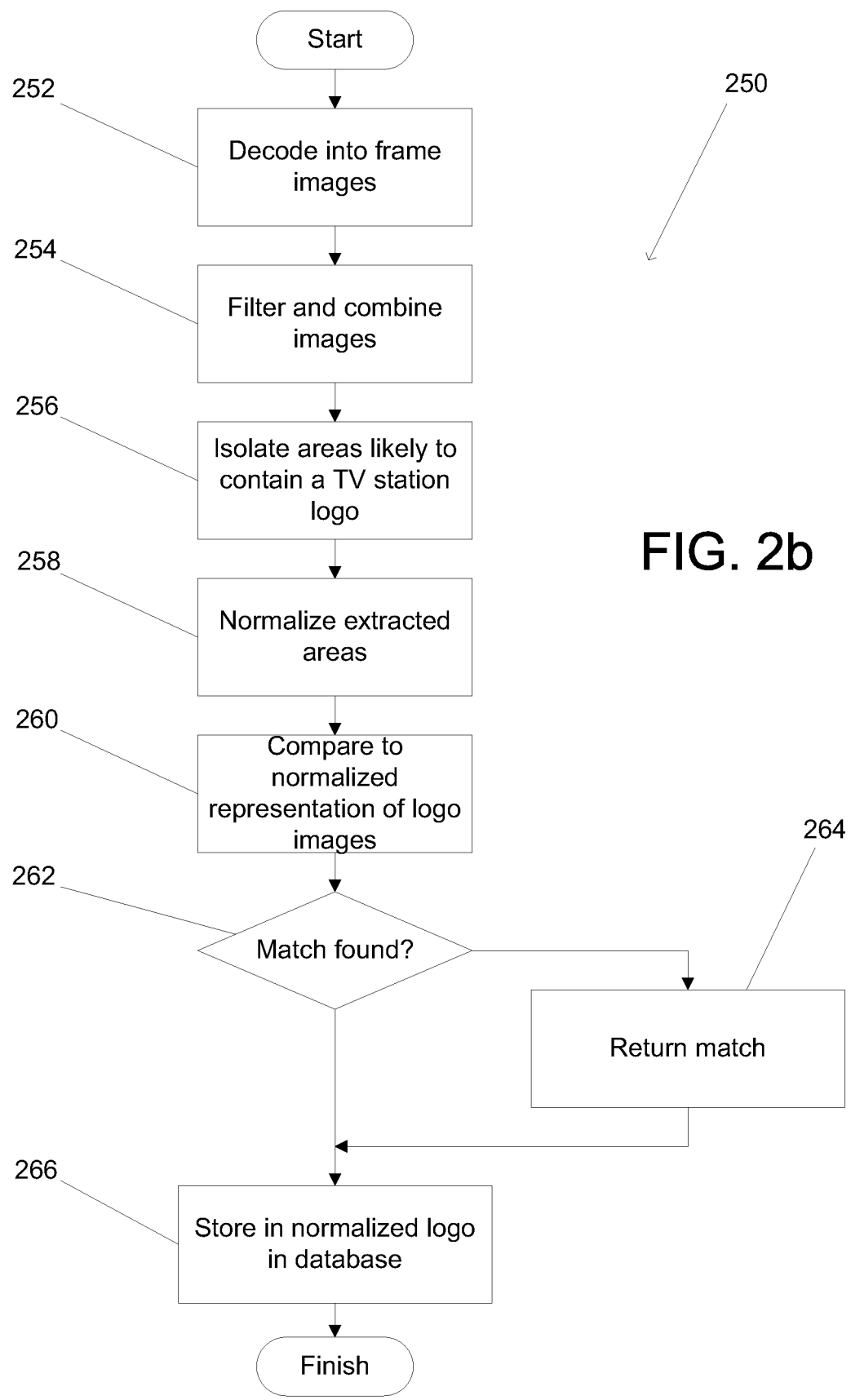
FIG. 2b is a flow chart showing a process for identifying a TV station logo in accordance with an embodiment of the invention.

Extraction and comparison of a TV station logo from a video media object in accordance with an embodiment of the invention is illustrated in FIG. 2b. The process 250 includes decoding (252) the media objects to obtain complete frame images. To emphasize the TV station logo, several images are filtered and combined (254). In one embodiment, filtering is performed by suppressing areas that vary between frames by assigning darker pixel values to them and the combination is performed by averaging frames into a resulting combined frame image. In other embodiments, a variety of different filtering and combining techniques are used to emphasize the TV station logo present in the complete frame images. Areas in the combined frame image that are likely to contain a TV station logo are then isolated (256) from the combined image. In many instances, these areas are: areas that contain no or little variation in comparison to the surrounding area; areas that have a minimum and a maximum size relative to the entire frame size, defined by the typical size of application of TV station logos in broadcast content; areas that have a specified location defined by the typical location of application of broadcast bugs in broadcast content, such as the corners or sides of the broadcast content; and areas in the combined frame image that have a specific color or shade that is typically used for the application of TV station logos, such as white. The extracted areas are normalized (258) in size and color distribution, i.e. scaled to a predetermined dimension. Normalized properties can include width of the image in pixels, and/or aspect ratio. If the video to be analyzed may have been changed in aspect ratio, the aspect ratio is normalized by scaling the width and height to a predetermined absolute value. Another property that can be normalized is luminance distribution. The extracted area can be normalized in its luminance distribution by application of a histogram stretch that distributes the luminance values present in the extracted area to all possible luminance values from white to black. The extracted area is then compared (260) to normalized representations of logo images in a logo database. A determination (262) is made based upon the comparisons concerning whether the extracted area contains a known logo image. The match can be established with a resulting matching score that is compared to a given threshold. If several matching scores are above the threshold, the match with the highest score is determined to be the corresponding logo and returned (264) as a match; otherwise the extracted area is determined to not be present in the logo database. Regardless of whether a match is found, the resulting logo it is stored (266) in the database for future comparison, to enhance future comparison results and to increase the score of future matches.

The interpretation of the TV station logo might initially seem not well suited for reliable identification of the content as it can be removed or altered. While the technical knowledge of doing so might not be available to the average consumer, it is an apparent risk for today's common scenarios in which users upload content that is copyrighted and they are aiming to foil a system for automatic content recognition in order to prevent the content from being recognized and the playback from being blocked. In many embodiments, the system does not simply block the content, but allows content to be distributed and combined with advertising in a way that would share profits between the distributor, the content owner and possibly the individual providing the content and therefore creating a motivation for all parties to maintain the identification information. In other embodiments a warning message informs the user that his attempted action is illegal in order to discourage further attempts.

A false interpretation of the logo may occur if the logo is used in combination with content that is not originating from the entity identified by the logo. In this case, the underlying content does not violate the copyright of the entity identified by the logo. However, the unauthorized use of the logo is likely something the entity that owns the right to the usage of the graphic would like to detect.

Other examples of semantic information that can be derived or estimated from media objects and used to assist in identifying a copyright owner, depending on the available components (image, audio, video) are:

News anchors, actors and athletes identified through automatic speaker recognition from the audio and face recognition from the picture relate to a specific news show or sporting event for which copyright and distribution rights can be identified Sport disciplines from the recognition of predominant colors (such as green for sports played on grass, or blue for swimming), characteristic sounds (such as a tennis racquet hitting a ball or engine sounds of race cars), and typical words recognized with speech recognition.

General keywords can be derived using speech recognition and OCR. OCR is applicable to features like score information, display of athlete names or anchor names as well as credits and closed captioning.

The repetition of keywords in spoken or written content can be used to determine their importance within the content and can be matched to known keywords within content or content categories.

Proprietary or proper names like a team name a name of a fictional character or town or the name of a celebrity.

Specific shows and episodes can be estimated though use of interpretation of written or spoken names, locations, intro sequences or typical melodies or jingles.

Genre classification that separates sports, romance movies, action movies, music clips, cartoons, news broadcast, advertisements and professional vs. amateur recording and editing through a combination of video scene characteristics (such as length, panning, still, zoom, shaking camera), audio cuts properties (such as frequency, variation, noise levels) audio levels, color distribution, and motions intensity together with features mentioned above.

Location; for example differentiation between indoor and outdoor scenes can be estimated by analysis of contrasts, colors and frequency information.

Keywords from contextual information that appears together with the media object such as a file name, or description offered together with the media object on an Internet website.

Country of origin recognized by language recognition in audio or text or by specific symbols such as TV stations or TV rating symbols.

TV rating by detection of TV rating symbols

Differentiation of TV broadcast vs. motion pictures by classification of genres, logos, or elements as described above.

Camera equipment and post processing options can be estimated by analysis of features such as the color histogram, noise level, brightness, contrast and pre-dominant colors.

To match the recognized semantic information to the content owner, the semantic information is compared to previously supplied information. E.g., the TV station logos extracted from the content are compared to a database of known logos.

In many embodiments, each piece of semantic information is indicative of a match probability for the content and a copyright owner. For example, the identification of the TV station logo indicates a specific copyright owner with a probability according to the quality of the match of the logo in the video with the logo stored in a reference database. The extraction of keywords from OCR and speech recognition can result in a different match probability to that copyright owner. The probabilities are combined in order to obtain a better estimation of the likely copyright owner. The resulting probability is compared to a set threshold value that determines if the match is good enough to conclude if a copyright owner has been successfully identified.

The supply of known elements might occur after or before extraction. For the example of TV station logos, the logos can be extracted from Internet content and content is grouped by logos before the logo is submitted for comparison and identification. Alternatively, the logo is supplied to the database before the Internet content is analyzed.

One of the advantages of semantic information is its interest independent of copyright owner identification. It is therefore stored and archived in existing, often publicly available databases that can be used to assemble semantic properties and prepare them for comparison as well as refining a performed analysis with a search in those existing databases. The following list provides examples for such databases that contain semantic information useful for comparison:

Collections of movie descriptions, such as The Internet Movie Database that is publicly available at IMDB.com lists producing studios, film titles, names and pictures of actors and a content descriptions of many movies.

Internet search engines make information accessible that is related to semantic movie content such as television show content, actor pictures and movie dialogues. General search engines like the Google service provided by Google, Inc. of Mountain View, Calif. can be used with specific keywords to identify the connection of published semantic information to a specific movie and dedicated movie search engines like the blinkx.com service provided by Blinkx of San Francisco, Calif. gather semantic information about video content available online.

Trademark databases with logo images contain information about trademarked logo image in connection with their respective owners.

In one embodiment of the invention, information about semantic elements in a media object to be supplied is gathered automatically. Once knowledge about a specific media object is derived from semantic or contextual information, other information can be used to extend that knowledge. E.g., if through analysis of contextual keywords, TV station logo, closed captioning or program guide information the content and ownership is identified and matched to a specific genre such as a TV series. Semantic properties such as sounds and image characteristics may be analyzed and stored as characteristic of an association with an entity in order to improve future analysis.

A combination of semantic properties that is learned in this way, or directly supplied to a reference database, can be used to combine semantic information to significantly improve estimates of content origin and ownership. In a number of embodiments, the system uses an expert system that learns associations between different pieces of semantic information that are indicative of an increased likelihood of association with a particular entity. For example, a popular television series can include titles, theme music and characteristic voices, which are likely to be associated in each episode of the televisions series. Many embodiments of the invention observe such associations and use them when attempting to identify ownership of media objects.

The reference database utilized by many embodiments of the invention can be created and maintained though analyzing TV content and combining it with information about this content, such as date and time of the broadcast, program guide information and closed captioning. In particular, closed captioning provides a rich source of information and combination of keywords that are likely unique and can be matched to speech recognition results.

This reference database can also be used to find more information about already identified content, such as broadcasting time or keywords in the content. Those keywords in turn can be used to assign advertising commercials to be combined with the content. Using the additional information, this advertising can be targeted to the content so that the advertised products and services match the content and the likely interests of the viewer. In several embodiments, advertisers can indicate a desired association with semantic information such as actors, stations, keywords, which is used to match their advertisement to specific pieces of content.

In one embodiment, the derived semantic information is used to create a matching score that is used to trigger an event of content use, typically based on business rules. That event can be to delete the content, claim ownership rights to the distributor or add commercials to it.

The semantic information derived in that fashion can also be used to combine the media objects with advertisement that is adjusted to the content and the likely interests of its consumer.

In another embodiment of the invention, the detection of semantic information and estimation of the copyright owner is used to improve on technologies like fingerprinting, by using the pre-selection, to limit the number of possible matches that the comparison of the fingerprinting system has to perform, or by combining match probabilities for a more reliable detection.

In one embodiment the media objects are identified using a web crawler that follows connected Internet pages and automatically analyzes their content to identify and analyze media objects. Keywords contained on these pages can be taken into account to narrow the search for specific content. The location, frequency and size of those keywords can be taken into account to weigh their relevance.

In yet another embodiment, the semantic information is matched against user profiles of copyright owners that are seeking to identify their content and therefore provide keywords, actor or athlete names, logo shape color size and position, copyrighted material and other information for content analysis.

The architecture for the system that aims to classify the content can be designed to reside on the site of content distributors and UGC sites, where the media objects are accessible. A database of semantic properties can be located locally and updated with new information remotely or might reside on a remote and central destination where it is updated. The media objects on the site may be analyzed on a regular basis with an updated semantic database to compare against. The media objects are also analyzed during upload or ingest in the system. Alternatively the system can reside at the location of a third party that downloads content and crawls for or scans media objects available online in order to process them. This might be in particular applicable in the case where UGC sites are not willing and interested to run the process on their site. In addition it would include the advantage to have access to multiple sites while having direct access to a database of semantic properties. A third alternative is that content owners run the application on their side where they might be scanning exclusively for content that belongs to them.

The result of the analysis can be used to determine access and usage rights. While the content that is distributed is commonly assumed to be unrestricted, the content analysis is useful in allowing restrictions to be applied to its use. Restrictions include but are not limited to a notification of the distributor who the content owner is, a notice of licensing terms for further distribution methods or channels, notice to stop the content distribution, or notice that the content is to be displayed with advertising. The advertisement media objects to be combined with the content may be provided by the content owner and may be in the media type of the identified media object or in other types such as keywords or textual messages to be displayed with the content or internet links that provide access to associated information provided by the content owner.

Using Semantic Properties for Additional Content Analysis

The comparison of semantic properties of a media object to be analyzed to a pre-existing component such as a TV station logo serves, in another embodiment of the invention to determine content transformation that the media object has undergone. The knowledge of transformations provides important clues to the origin of content and may be an indication that the content has been used and derived in an illegal fashion. Transformations are also important to understand for the purpose of advertising, licensing or quality-control of the content. In addition, knowledge of the transformations can be used to assist in the extraction of any watermark information contained within the media object.

Transformations that are important to be detected include, composition of media objects through addition in intervals or combination in the same time, overlay of graphical or textual information and geometric transformations such as resizing, aspect ratio change, rotation and recompression; and sound transformations such as translation, mixing.

The comparison of semantic information derived from the content with semantic information that are known or expected reveals a difference between the content to be analyzed and the expected content and allows deriving the transformations mentioned above. For example, the extracted logo identified in the content is compared to the logo expected in the content and the difference may be a change in aspect ratio or size that reveals that the content has undergone the same transformation. Other examples include:

a) A degradation in quality that is identified as a low pass filtering within blocks of size 8×8 or 16×16 pixels indicate the presence of compression. The amount of absent high frequencies and the amount of blockyness indicates the strength of the applied compression b) The addition of high frequencies to the existing reference image indicates an analogue conversion that the content has undergone before it was re-digitized. This transformation occurs if the content has been filmed with a camera from a screen display or has been recaptured from a transmission though an analogue cable connection.

If the extracted semantic property matches the reference property very well, it can be concluded that the content has not undergone any significant transformation.

Figure 3:
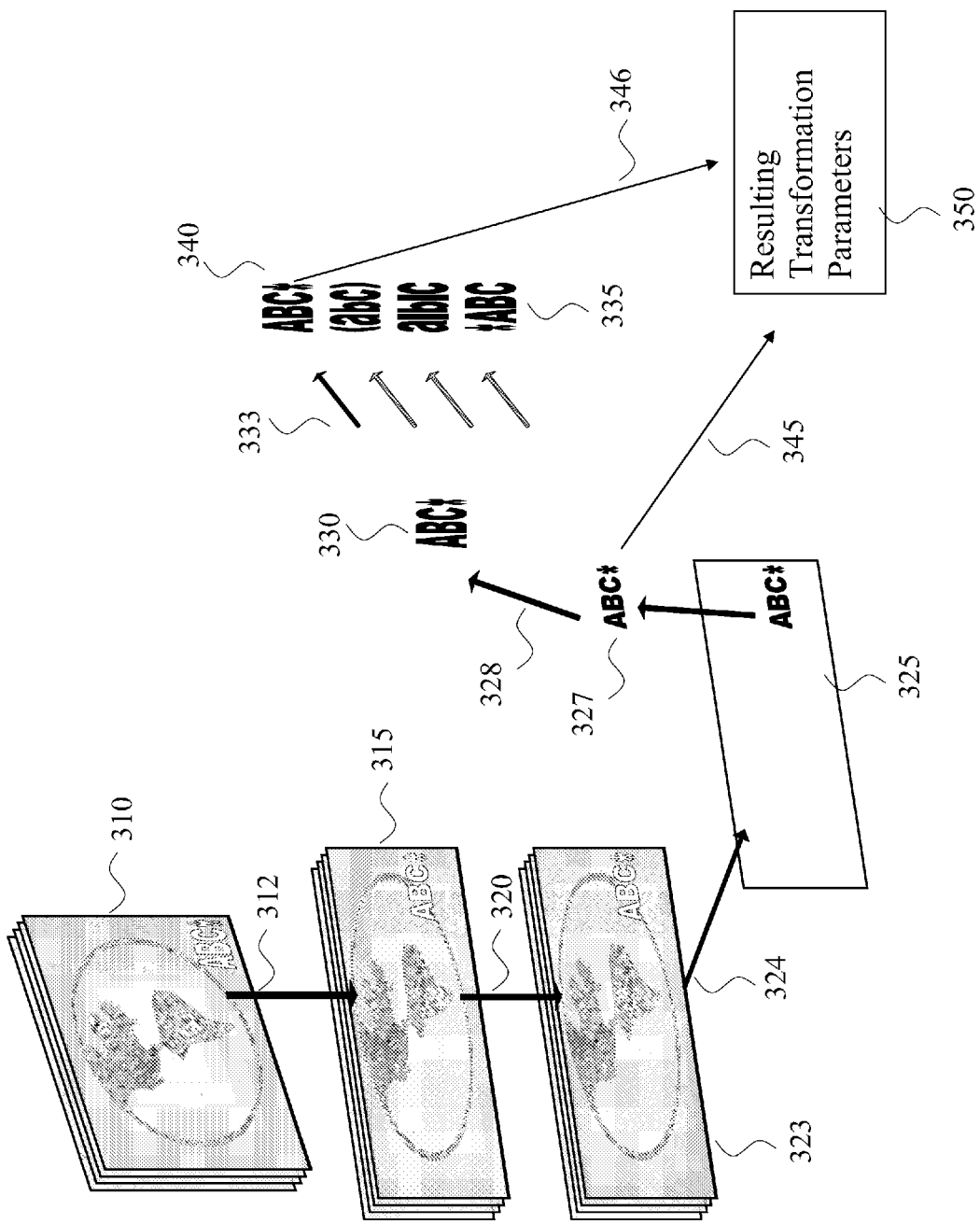
FIG. 3 is an illustrative diagram of a workflow to derive transformation parameters from an extracted TV station logo in accordance with an embodiment of the invention.

Referring to FIG. 3, in one embodiment, a diagram of a video clip media object in its original shape 310, is transformed by a modification of its aspect ratio (312) resulting in a transformed media object 315 that is located on the Internet. It is downloaded or retrieved in part (320) e.g. to a hard drive or memory location to a local media object 223. The following analysis (324) of the transformed media object creates a processed media object 325 and extracts semantic properties 227; here it is a TV station logo. The TV station logo is normalized (328) in size and aspect ratio to be the same size and aspect ratio as the reference logos 335. The extracted logo is then compared (333) to those semantic properties that serve as a reference 335. The comparison yields the closest match to the reference logo 340. The extracted logo 327 and the reference logo with the closest match 340 are compared to derive the resulting transformation parameters 350. The transformation parameters for the size and aspect ratio are the inverse to the transformation 328 that was used to normalize the logo. The transformation parameters that determine the frequency components are derived by a comparison of present image frequencies.

Using Semantic Properties for Synchronization

The identification of semantic properties as described above, serves to identify content degradation or manipulation of the content. In an additional embodiment the identification of those properties serves to synchronize the content in space or time. Known events and semantic properties occur at a defined space or time, for example, the intro melody for a television series occurs at the beginning of the content and the TV station logo is located at a well defined position.

Using the location of the TV station logo as an example, the identification of this element does provide information about geometric transformation that the content underwent. This information is useful to identify other semantic properties that are in a known relative position to the TV station logo. This information is also useful to identify invisible watermarks that require synchronization, i.e. knowledge of the spatial orientation of the content or its relative location in time. Once the size, aspect ratio and location of the TV station logo are understood, it is used to derive e.g. the center of the frame and its original dimensions. With this information, watermarking approaches that embed information at a known location are aided in locating the embedded information and thereby enabling their interpretation.

In an extension of the above described process, the same TV station logo that is otherwise used in a visible manner can be embedded in a almost completely transparent fashion instead, such that its presence is not apparent to a human observer. The extraction process described in above remains unaltered and identifies the logo embedded in various transparency levels. The resulting advantage is that content can be marked and identified in a uniform approach, whether the logo is embedded in a visible manner and also servers as visual notification to a human observer or whether it is instead used in an imperceptible manner on content where a human recognizable marker is not desirable. A method of invisibly embedding a human recognizable graphic in a video is described in U.S. Pat. No. 7,430,302 to Thorwirth, the disclosure of which is incorporated by reference herein in its entirety.

Additional Data Signaling

In another embodiment of the invention, data called additional data is added during the production or distribution of media objects, which provides a general purpose data channel for any form of data including, but not limited to, data signaling the copyright status of the content, or data providing copy control information.

Additional data signaling is part of or in addition to the human recognizable elements such as TV station logos and additional data signaling includes data that is embedded invisibly (on a frame-by-frame basis) and visible data in any combination. In addition to being used to maintain the original intent of signaling a human recognizable indicator of the station the additional data can be used for any other purpose.

There are many ways in which the inventive elements of this invention are used to add additional data to content or media objects. In one example a visible change is made to a portion of the media object. A visible change is applied to the media object logo (station or program logo) and examples of visible shape changes that are used to convey data include but are not limited to logo color changes to indicate the additional data. In another example the outline of the logo is varied with a thicker or thinner outline wherein the thickness of the outline is used to convey additional data. This is an example of a variation that may not be apparent to a human observer yet a significant differentiator during automated comparison. In another example, the TV station logo is used with additions to the logo that relate to the content and in the same time classify its use, such as an TV station logo with the addition of the text "late night show" that indicates the content origin as well as the context to the viewer and this information can be used to group the content and identify copyrights and usage restrictions.

The additional data including variations of the logo can indicate any form of data including various copyright messages, such as the allowed distribution, if the content can be paired with advertising, the owner of the content and the number of allowed copies. The TV station logos can be extracted and compared as described above to extract the additional data. The same TV station logo can also be used for the purpose of copyright signaling in an apparent or invisible manner while using the same extraction procedure can be used for either type. The invisible application is an example usage scenario for the much pirated movie content that typically does not contain a visible TV station logo. Movie content (or any other media object) includes an imperceptibly embedded TV station logo with optional addition data. When the movie files are copied, the invisibly embedded logos and additional data survive the copying and illegal distribution and can be used to convey usage rights to on-line content sharing sites or to detect copyrighted data. Broadcast TV content as opposed to movies on the other hand typically does contain a visible TV station logo, and this type of content is often copied to video sharing sites in small segments (1 to 30 minutes). In particular for TV content, those small segments that are illegally distributed are of interest to content owners that could otherwise sell the content or advertising with the content when distributed on a legal channel that is controlled by the copyright owner.

The human perceptibility of the additional data element of this invention range from completely invisible to completely visible and combinations of partially visible and invisible additional data signaling are anticipated. An example of various embedding techniques perceptibility is provided in the table below and uses the "ABC*" logo item 327 in FIG. 3 as an example:

| Human perceptibility of additional data. Example ABC* logo (FIG. 3-327) | Characters or symbols not visible to human (on a frame by frame basis) | Significance of data | Comments |
| --- | --- | --- | --- |
| ABC* | | ABC is the content owner logo. * represents one or more characters or symbols conveying additional data | In this example all the characters are visible |
| ABC | * | | In this example the content owner logo is visible and the * is invisible |
| | ABC* | | In this example both the content logo and other symbols and data are invisible |

In the above table the '*' character (shown in FIG. 3 327) was used to convey the additional data however any other form of data representation is applicable including a combination of graphic shapes, logos, alphabetic or other types of characters or symbols combined to signal ownership and copyright signal data. In addition the '*' character 327 was shown next to the 'ABC' text 327, however any spatial relationship is supported wherein the additional data is added with any spatial orientation to other portions of embedded logo, text, characters, or symbols. In one example, additional invisible symbols conveying additional data to the "ABC" text 327 with the addition invisible symbols displaced in both the x and y direction from the "ABC" text 327. The additional information may be conveyed with properties such as the presence or absence, location, shape and size of the added elements.

An additional data detection processing routine designed to detect the text, symbol, graphics or characters used to embed the additional data is performed to extract additional data. In one example the additional data detection is performed in FIG. 2B in a similar manner to steps 258 and 260.

In an example where the additional data conveys copy control information, the copy control information extracted in FIG. 2*b* is output providing other processing modules with copy control information for this media object.

Referring to FIG. 2, the various logos in 235 may be associated with different usage rights for the media object, while in the same time signaling the TV station 'abc' to the user in a visible fashion. The database 245 in this case does not only contain the graphic design of the various abc logos but also includes their meaning for usage rights.

Information may be signaled by several graphical elements or signaling images that are embedded by different entities. To resolve conflicts in cases where multiple information is identified, the information may be including a conflict resolution with priorities or conflicts may be resolved with a lookup of the most relevant information signaled.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method for restricting access to digital video content based on recognition of a TV station logo embedded within the video content that varies according to the video usage rights, the method comprising:
    extracting the TV station logo from the video content by combining several frames of video content;
    identifying the TV station logo by comparing the TV station logo to known TV station logos that most closely matches said TV station logo extracted from the video content, where the known TV station logos are associated with user profiles of copyright rights holders, and wherein at least some of the known TV station logos are supplied by rights holders for content analysis to identify their owned content;
    estimating a first match probability of the likely copyright rights holder based on the identified TV station logo;
    identifying a second media object within at least one frame of the video content different from the TV station logo;
    extracting at least a second semantic property from the second specified media object within at least one frame of the video content;
    matching said at least second semantic property of the second specified media object against the known semantic properties of known media objects associated with user profiles of copyright rights holders;
    comparing matches between said at least second semantic property and the known semantic properties to a second threshold value;
    estimating a second match probability of the likely copyright rights holder based on the second compared matches;
    combining the first match probability and the second match probability into a combined match probability;
    identifying a copyright rights holder based on at least the combined match probability;
    retrieving rules governing distribution rights of the content based at least on identification of the copyright rights holder; and
    restricting access to the digital video content in accordance with the retrieved rules.

2. The method of claim 1, wherein restricting access comprises combination of advertisement with said video content.

3. The method of claim 1, wherein said TV station logo is visibly embedded within the video content.

4. The method of claim 1, wherein said TV station logo is invisibly embedded within the video content.

5. A method for restricting access to a media object based on automatic recognition of human recognizable semantic properties evident during playback of the media object, the method comprising:
    extracting at least one semantic property from a first specified media object within at least one frame of video content;
    matching said at least one semantic property of the first specified media object against known semantic properties of known media objects associated with user profiles of rights holders, wherein at least some of the known semantic properties are generated from material supplied by rights holders for content analysis to identify their owned content;

comparing matches between said at least one semantic property and known semantic properties to a threshold value;

estimating a first match probability of the likely copyright rights holder based on the compared matches;

identifying a second media object within at least one frame of the video content different from the first media object;

extracting at least a second semantic property from the second specified media object within at least one frame of the video content;

matching said at least second semantic property of the second specified media object against the known semantic properties of known media objects associated with user profiles of copyright rights holders;

comparing matches between said at least second semantic property and the known semantic properties to a second threshold value;

estimating a second match probability of the likely copyright rights holder based on the second compared matches;

combining the first match probability and the second match probability into a combined match probability;

identifying a copyright rights holder based on at least the combined match probability;

retrieving rules governing distribution rights of the video content based at least on identification of the copyright rights holder; and determining allowed actions that can be performed with respect to the media objects based upon the retrieved rules;

restricting access to playback of video content containing the media objects in accordance with the allowed actions.

6. The method of claim 5, wherein said specified media object is present on at least one of: a website, a file transport protocol site, a peer to peer network, a disc drive, a hard drive, a computer, a compact disc, and a digital video disc.

7. The method of claim 5, wherein the known semantic properties are derived from previously identified semantic properties.

8. The method of claim 5, wherein the semantic property is identification of a TV station logo on at least one frame of a video track within the media object.

9. The method of claim 5, wherein the semantic information is the result of optical character recognition on at least one frame of a video track within the media object.

10. The method of claim 5, wherein the semantic property is the result of performing speaker recognition on an audio track within the media object.

11. The method of claim 5, wherein the semantic property is the result of performing automated speech recognition on an audio track within the media object.

12. The method of claim 5, wherein restricting access to playback of video content containing the media object in accordance with the allowed actions comprises restriction to playback in combination of advertisement with said video content.

13. The method of claim 5, wherein said restriction of access includes notification of the content distributor of the access rights.

14. The method of claim 5, further comprising:
identifying a second media object within the video content different from the first media object;
extracting at least a second semantic property from the second specified media object within the video content;
matching said at least second semantic property of the second specified media object against the known semantic properties of known media objects associated with user profiles of copyright rights holders;
comparing matches between said at least second semantic property and the known semantic properties to a second threshold value;
estimating a second match probability of the likely copyright rights holder based on the second compared matches;
combining the first match probability and the second match probability into a combined match probability; and
identifying a copyright rights holder based on at least the combined match probability.

15. The method of claim 1 where the copyright rights holders are copyright owners.

16. The method of claim 15 further comprising locating the TV station logo within the video content through scanning online sites; and
wherein restricting access to the digital video content in accordance with the retrieved rules comprises notifying a content distributor of the video content that the content is copyright protected and who the identified content owner is.

17. The method of claim 5 where the copyright rights holders are copyright owners.

18. The method of claim 17 further comprising locating the specified media object within video content through scanning an online site containing user-generated content; and
wherein restricting access to playback of video content containing the media object in accordance with the allowed actions comprises notifying a content distributor of the video content that the content is copyright protected and who the identified content owner is.

19. The method of claim 1 wherein identifying a copyright rights holder based on at least the estimated match probability comprises identifying a broadcast source.

20. The method of claim 8 wherein identifying a copyright rights holder based on at least the estimated match probability comprises identifying a broadcast source.

21. The method of claim 1 further comprising:
identifying keywords in the identified content using a reference database of semantic properties; and
assigning advertising commercials based upon the identified keywords advertising into the video content; and
wherein restricting access to the digital video content in accordance with the retrieved rules comprises combining the advertising commercials into the video content.

22. The method of claim 5 further comprising:
identifying keywords in the identified content using a reference database of semantic properties; and
assigning advertising commercials based upon the identified keywords advertising into the video content; and
wherein restricting access to playback of video content containing the media object in accordance with the allowed actions comprises combining the advertising commercials into the video content.

23. The method of claim 18, wherein notifying a content distributor of the video content that the content is copyright protected and who the identified content owner is comprises issuing a take down notice to stop distribution of the video content.

* * * * *